United States Patent [19]

Clark, Jr.

[11] 4,137,647
[45] Feb. 6, 1979

[54] HEAT AND HUMIDITY RECOVERY DEVICE FOR USE WITH CLOTHES DRYER

[76] Inventor: James N. Clark, Jr., 4784 Brooklyn, S.E., Grand Rapids, Mich. 49508

[21] Appl. No.: 830,406

[22] Filed: Sep. 6, 1977

[51] Int. Cl.² .................. F26B 19/00; F26B 21/06; B01D 39/00; B01D 50/00
[52] U.S. Cl. ............................. 34/82; 34/86; 138/89; 55/485; 55/522; 55/DIG. 13
[58] Field of Search .............. 34/82, 86; 55/485, 522, 55/DIG. 13; 138/89

[56] References Cited

U.S. PATENT DOCUMENTS

| | | | |
|---|---|---|---|
| 1,624,650 | 4/1927 | Anfossi | 34/82 |
| 3,038,631 | 6/1962 | Calder | 138/89 |
| 3,716,925 | 2/1973 | Hartung | 34/235 |
| 3,882,961 | 5/1975 | Cannan et al. | 55/522 |
| 3,999,304 | 12/1976 | Doty | 34/86 |
| 4,011,662 | 3/1977 | Davis et al. | 34/86 |
| 4,034,482 | 7/1977 | Briscoe | 34/86 |

*Primary Examiner*—John J. Vrablik
*Attorney, Agent, or Firm*—Price, Heneveld, Huizenga & Cooper

[57] ABSTRACT

A device for recovering and using the hot, moist air exhausted from a clothes dryer is disclosed. The device includes a housing having a supply inlet, an exterior vent outlet and a heating outlet. Valve means are provided for selectively closing off the vent outlet so that hot, moist air may pass from the supply inlet to the heating outlet. A staged filtration system is supported within the housing for filtering the lint and other particulate matter from the hot, moist air as it passes from the supply inlet to the heating outlet. The heating outlet is connectable to an existing heating duct or the device may be vented directly into the interior of the building within which it is used.

8 Claims, 7 Drawing Figures

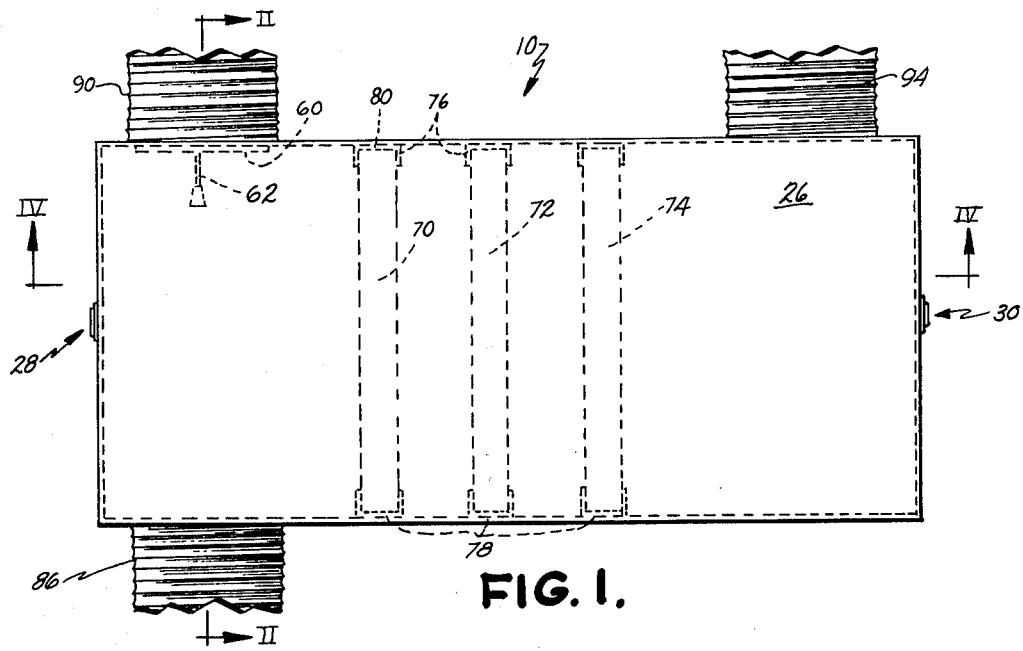
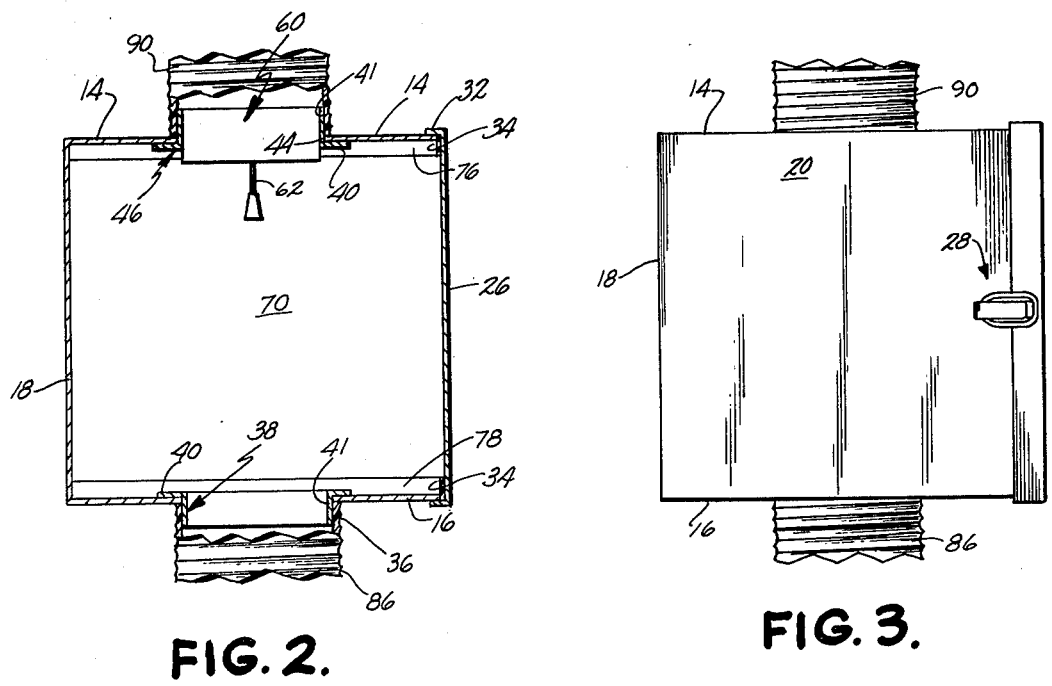

HEAT AND HUMIDITY RECOVERY DEVICE FOR USE WITH CLOTHES DRYER

BACKGROUND OF THE INVENTION

The present invention relates to heat recovery systems and more particularly to a unique apparatus for filtering and recovering for use the heated, moist air exhausted from conventional clothes dryers.

Typically, clothes dryers whether of the electric or gas type are vented exteriorly of the residence or building. Clothes dryers normally include some form of lint trap or filter for removing the flammable lint from the hot, moist air. Usually, the lint trap takes the form of a mesh or screen which does not effectively remove all of the lint and other particles from the air prior to venting directly to the atmosphere exteriorly of the building.

The average clothes dryer has an air requirement of between 150-250 cubic feet per minute during operation. This means that the dryer will exhaust approximately one-half of the air in a 1500 sq/ft home. This represents a substantial waste of energy in that this intake air has been heated by the existing home heating system. Also, this air must be replaced and typically the make-up air comes into the home from the outside. As a result, the make-up air must again be heated by the existing home heating system.

Further, in order to increase the comfort levels within a residence or building and to reduce the heating costs, humidifiers are installed. The humidifiers increase the moisture level of the heated, dry air put out by the existing heating system therefore increasing the comfort levels and preventing damage to the structure, furnishings and carpet which may result from the dry, unhumidified air.

In order to reduce the energy loss resulting from the venting of the heated, humid air exteriorly of the building and to increase the humidity levels within the home, it has been proposed to vent this air directly into the space within which the dryer is located. For example, in U.S. Pat. No. 3,716,925, entitled HUMIDIFIER ATTACHMENT FOR CLOTHES DRYERS, issued Feb. 20, 1973 to Ray E. Hartung, a humidifying chamber is disclosed as part of the vent pipe of the clothes dryer. The chamber includes a wrap around filter and a damper control. The heated, moist air normally vented exteriorly from the dryer may be passed through the chamber and filter. The air, however, is delivered only to the area within which the dryer is located.

U.S. Pat. No. 3,487,624, entitled LINT CATCHER, issued on Jan. 6, 1970 to G. Tignanelli, is representative of prior art lint catchers connectable to a clothes dryer and which also permits the filtered air to be vented directly into the area within which the dryer is located. The Tignanelli patent discloses a box-shaped enclosure having an inlet connectable to the vent outlet of the dryer from which filtered, dryer exhaust air is vented. A primary filter extends through the enclosure and a secondary filter is positioned within a tube defining a heated air outlet.

SUMMARY OF THE INVENTION

In accordance with the present invention, a unique device is provided for selectively venting heated, moist air from the clothes dryer to either an exterior vent or into the building or residence and which possesses the qualities of ease of manufacture, ease of assembly, ease of use and reliability in operation. Essentially, the unique device includes an enclosure defining a supply inlet, a vent outlet and a heating outlet. Provision is made for selectively closing off either the vent outlet or the heating outlet. A staged filtration means is provided for filtering the hot, moist air passing from the supply inlet to the heating outlet. The staged filtration means includes a plurality of depth build-up filters resulting in ease of operation, high filtering effectiveness and reliability as well as simple and effective cleanability allowing repeated reuse of the filters saving energy, material and expense.

BRIEF DESCRIPTION OF THE DRAWINGS

FIG. 1 is a front, elevational view of the unique hot air recycling device in accordance with the present invention;

FIG. 2 is a cross-sectional view taken generally along line II—II of FIG. 1;

FIG. 3 is a side, elevational view of the unique device in accordance with the present invention;

DETAILED DESCRIPTION OF THE PRESENT INVENTION

Figure 4:
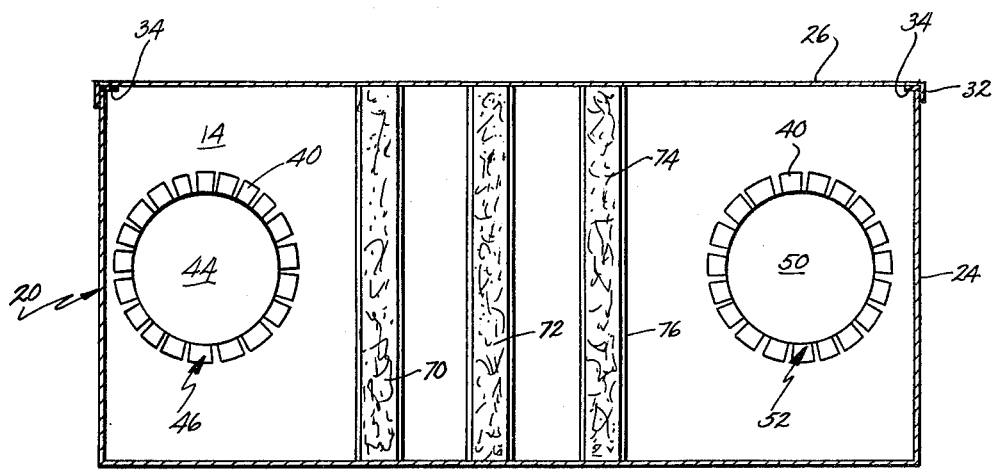
FIG. 4 is a cross-sectional view taken along line IV—IV of FIG. 1.

The unique device for filtering lint from a conventional clothes dryer and recycling the heated, humidified air into a building or home heating system in accordance with the present invention is illustrated in the drawings and generally designated 10. As seen in FIGS. 1–4, the device 10 includes a housing or enclosure 12. The enclosure 12 has a top wall 14, a bottom wall 16, a rear wall 18 and end walls 20, 24. A front wall 26 is removably secured to the front of the enclosure by conventional latches 28 and 30 positioned at each end. As seen in FIG. 2, the front wall 22 includes a peripheral flange or skirt 32 and is dimensioned to fit over the front of the enclosure. A plurality of sealing strips 34 are secured to the removable front wall portion 26 adjacent its peripheral edge in order to provide an effective seal between the front wall 26 and the lateral edges of the top, bottom and end walls.

In the preferred embodiment, the bottom wall 16 defines an aperture 36 adjacent one end (FIG. 2). Aperture 36 is a supply or vent inlet. Positioned within the aperture 36 is a flanged coupling 38. The flanged coupling 38 includes a circular flange portion 40 resting against the inner face of the bottom wall 16 and a skirt portion 41 extending through the aperture. The upper wall 14 defines an aperture or vent outlet 44 (FIGS. 2 and 4) which is generally in line with the supply inlet or vent inlet 36. Similarly, a flanged coupling 46 is disposed within the aperture 44. The top wall 14 at a position diagonally opposed from the supply inlet 36 defines another aperture 50. The aperture 50 is a heating or filtered air outlet. A flanged coupling 52 is disposed within outlet 50. The flanged couplings 38, 46, and 52 may be fabricated from sheet metal duct or they could be molded from a suitable plastic material.

Figure 5:
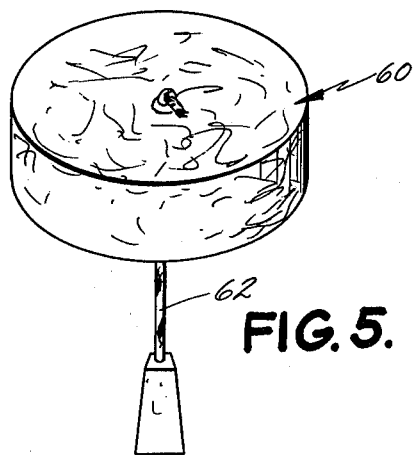
FIG. 5 is a perspective view of the means included in the present invention for selectively closing the outlets of the device.

As seen in FIGS. 2 and 5, a plug member or valve means 60 is provided for selectively closing off the vent outlet 44 or the heating outlet 50. The plug 60 is preferably fabricated from a nonreticulated foam material and includes a cord 62 attached thereto. The cord 62 is grasped to pull the plug from the coupling. In the alternative, damper valves could be installed in the vent outlet and the heating outlet. It has been found, however, that sheet metal dampers do not provide 100% effective seal at the outlets. The nonreticulated foam plug which is dimensioned slightly greater than the diameter of the vent outlet and the heating outlet effectively seals these outlets to permit selective exterior or interior venting. The plug is easy to manufacture, install and is reliable in use.

Supported within the enclosure 12 is a staged filtration system. As seen in FIGS. 1, 2 and 4, the staged filtration system includes a plurality of filters 70, 72 and 74. The first filter 70 is positioned adjacent the supply inlet 36 and the third filter 74 is positioned adjacent the exhaust or heating outlet 50. The filters are supported within the entire interior and extend between the rear and front walls 18, 26. The filters are held within the interior of the enclosure by upper and lower, channel-shaped tracks 76, 78, respectively. Each track includes a base 80 welded or otherwise suitably secured to the respective inner surface of the upper and lower walls. The sidewalls 82 of the tracks are spaced a distance slightly less than the thickness of the filters 70, 72 and 74. This insures that a tight seal or fit is maintained between the filters, the tracks and the interior of the enclosure 12. The filters 70, 72 and 74 are positioned in series and in spaced, parallel, relationship to one another. As a result, when the plug 60 is positioned in the vent outlet 44, the unfiltered, hot, humid air from the clothes dryer will pass through the serially arranged filters to the heating outlet 50.

Figure 6:
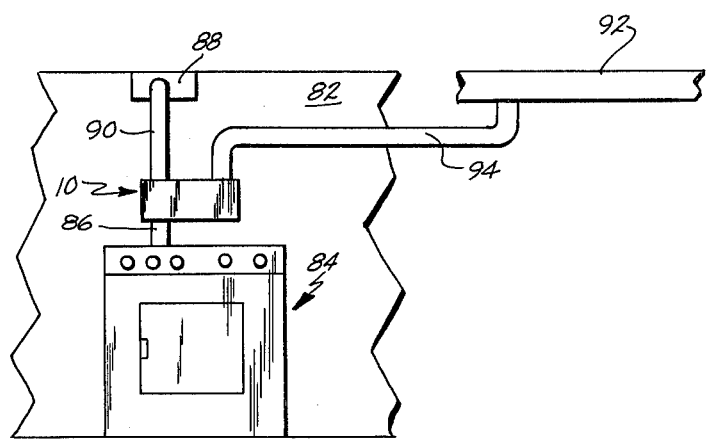
FIG. 6 is a schematic illustrating the manner of installing the device in accordance with the present invention.

As seen in FIG. 6, the device 10 may be suitably mounted on a wall 82 directly behind a clothes dryer 84. Simple bolts or screws passing through suitable apertures in the rear wall may be used to mount the unit. The supply inlet 36 is connected to the clothes dryer outlet or exhaust through a suitable tube or duct 86. The vent outlet 44 is an exterior outlet connected to an exterior vent 88 by a suitable duct 90. The heating outlet 50 is preferably placed in direct communication with an existing return heating duct 92 in the forced air heating system by a flexible duct 94. The outlet 50 should not be connected to the output or positive duct of a forced air system. Such a connection could result in the forced air being blown into the clothes dryer. This would affect the operation of the dryer and the heat recovery device. If a gravity or natural convection heating system is employed in the building, the device 10 is preferably connected to the positive heating duct. With such a heating system, there is no danger of the air from the heating system adversely affecting operation since the air is not under pressure. It is presently preferred that conventional, flexible spiral wound duct be employed for the connection.

In this manner, the filtered, warm, humid air will be passed directly into the existing home or building heating system and thereby uniformly distributed throughout the building. This insures the most efficient and effective use of the recovered, hot, moist air from the clothes dryer 84. The tubing 86, 90 and 94 is connected to the inlet and outlets, respectively, with simple band clamps. During warm weather or when the supplemental heating is not desired, the user need merely switch the plug 60 from the vent outlet to the heating outlet. The air will then be discharged out the vent 88.

It is preferred that a minimum of three filters be employed in the staged filtration system. The first filter 70 is a coarse filter, the second filter 72 is a medium filter and the third filter 74 is a fine filter. This three-stage system insures that the air exhausted into the existing home heating system is lint and particle free. The filters are preferably fabricated from a reticulated, fully "open pore", flexible ester type of polyurethane foam. It is presently preferred that the first or coarse filter 70 have a pore count of 10 ppi (pores per linear inch), that the second or medium filter 72 have a pore count of 20 ppi and the third or fine filter 74 have a pore count of 30 ppi. The reticulated polyurethane foam filter material is preferably a three-dimensional skeletal structure of strands providing a 97% void space. Such a filter material provides a "depth" build-up when removing the particulate matter from the warm or hot air. The depth build-up provides increased service life between cleanings. Further, the reticulated foam provides a reusable filter which may be cleaned as by vacuuming and which is largely unaffected by heat and moisture. The depth build-up type of filter has substantially increased service life when compared to fiberglass type filters. These latter filters will have build-up of lint on their surfaces. As a result, they clog faster, efficient filtering of the air is not provided and increased service requirements would result. Suitable filter material of the preferred type is manufactured by the Foam Division of Scott Paper Company and sold under the brand name, Scott Industrial Foam.

In a presently existing embodiment of the present invention, the enclosure has a height of approximately 10 inches, a length of approximately 22 inches and a depth or width of approximately 10 inches. The filters 70 are dimensioned to extend from the front to the rear of the enclosure as well as from the top to the bottom and have a thickness of approximately 1 inch.

Figure 7:
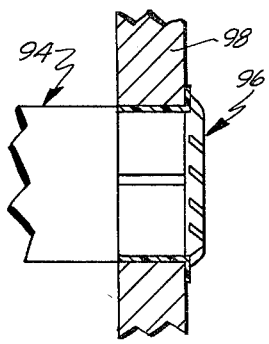
FIG. 7 is a fragmentary, cross-sectional view showing an alternative venting arrangement.

The unique hot, humid air recycler is accordance with the present invention is capable of directing filtered air to the existing air heating system of a home. In the alternative, as shown in FIG. 7, the outlet duct 94 from the heating outlet 50 may be connected to a vent 96 disposed in a wall or floor 98. In this manner, the hot air may be exhausted exteriorly of the utility room within which the dry cleaner 84 is located and may be directed to one or several rooms away from the dryer. This alternative venting would be used in buildings not having heating ducts, i.e., circulating hot water, steam or other non-air ducted systems. Further, the hot, humid filtered air could be exhausted directly into the area around the clothes dryer 84. This venting directly into the space occupied by the dryer is not preferred since such venting would result in slightly longer drying cycles. The intake air to the dryer drawn from the area around same would be the humidified or moist air exhausted from the device 10.

The unique device in accordance with the present invention is capable of transferring as usable heat for the home, building or other structure, almost all of the heat generated by the clothes dryer. Also, since the clothes dryer removes water from the clothing and suspends it in the air, the humid air is also transferred to the house. In an average eight pound load of wash, approximately eight pounds of water are discharged or exhausted by the dryer. As a result, the device in accordance with the present invention will place approximately one gallon of water into the existing heating system during a typical 30–45 minute drying cycle. The three-stage filtration system effectively removes all of the lint and other particulate matter from the air and permits the air to flow with minimal interference thereby producing little or no back pressure on the dryer, protecting the dryer mechanism and insuring quick drying. The device may be easily installed in the home. All that is necessary is to mount the unit at a convenient location, preferably on the wall behind the clothes dryer and connect the unit to the clothes dryer vent, the exterior vent and the existing return heating duct of the home in forced air heating systems or the positive heating duct of a gravity heating system. When the blower of the forced air system is not operating, the heated, moist air exhausted from outlet 50 will enter the rooms of the building through the return duct vents. The system in accordance with the present invention therefore functions effectively even if the forced air system is not operating.

The heat and humidity recovery device also provides a convenient location for mounting an automatic dryer shut down mechanism. The mechanism is a humidistat control (not shown) for sensing the level of humidity in the vented air. When a level is reached corresponding to the clothes being fully dry, the control would automatically shut down the operation of the clothes dryer. Such a control reduces wasted energy associated with overdrying. The control may operate an on-off switch in the dryer or a switch between the dryer and its power source.

In view of the above description, those of ordinary skill in the art will undoubtedly envision various modifications which would not depart from the inventive concepts disclosed herein. As a result, it is expressly intended that the above description should be considered as that of the preferred embodiment. The true spirit and scope of the present invention will be determined by reference to the appended claims.

The embodiments of the invention in which an exclusive property or privilege is claimed are defined as follows.

1. A device for selectively venting hot, moist air from a clothes dryer vent either exteriorly of a building or interiorly of the building, said device comprising:
   a housing having front and rear walls, top and bottom walls and end walls, said housing defining an inlet connectable to the clothes dryer vent; a vent outlet connectable to an exterior vent and a heating outlet, said heating outlet communicating with the interior of the building;
   valve means for closing off said vent outlet so that the hot, moist air from said inlet passes through said housing to said heating outlet, said valve means comprising a nonporous foam plug dimensioned to plug and effectively seal said vent outlet; and
   staged filtration means supported within said housing for filtering the hot, moist air as it passes from said inlet to said heating outlet, said staged filtration means including a coarse reticulated foam filter for removing large particles, a medium reticulated foam filter for removing intermediate size particles and a fine reticulated foam filter for removing small particles, said filters each being depth build-up filters, said filtration means further including filter support means carried by said housing for supporting each of said filters and maintaining a tight seal between said filters and the interior of said housing and said filters being positioned within said housing so that the hot, moist air passes serially through the coarse filter, the medium filter and then the fine filter to said heating outlet.

2. A device as defined by claim 1 wherein one of said walls is removably carried by said housing to permit access to the interior of said housing.

3. A device as defined in claim 2 wherein each of said filters is a reticulated, flexible polyester, urethane foam filter.

4. A device as defined by claim 3 wherein said nonporous foam plug comprises a nonreticulated, urethane foam plug dimensioned to plug said vent outlet.

5. A device as defined by claim 4 further including duct means secured to said housing at said heating outlet for connecting said heating outlet to an existing heating duct within said building so that said heating outlet communicates with the interior of the building.

6. An improved device for filtering hot, humid air vented from a clothes dryer and delivering the filtered air to the interior of a building, said device being of the type including an enclosure, filter means within said enclosure, an inlet connectable to the dryer and a filtered air outlet, the improvement comprising:
   an exterior vent outlet opening through said enclosure generally in line with said inlet;
   means for selectively opening and closing said vent outlet, the hot, moist air passing through said vent outlet when open and through said filtered air outlet when closed, said means including a resilient plug dimensioned to fit sealingly within said vent inlet; and
   said filter means comprising:
   a first coarse filter;
   a first trackway means carried by said enclosure for sealingly supporting said first coarse filter;
   a second medium filter positioned downstream of said first filter;
   a second trackway means carried by said enclosure for sealingly supporting said second medium filter;
   a third fine filter positioned downstream of said second filter; and a third trackway means for sealingly supporting such third fine filter, said filters serially filtering said hot, humid air passing from said inlet to said filtered air outlet and each of said filters being reusable depth buildup reticulated, flexible urethane foam filters, each of said trackway means compressing each of said filters along lateral edges thereof.

7. An improved device as defined by claim 6 wherein said first filter has a porosity grade of approximately 10 ppi, said second filter has a porosity grade of approximately 20 ppi, and said third filter has a porosity grade of approximately 30 ppi.

8. An improved device as defined by claim 7 further including:
   a first duct connecting said vent inlet to said clothes dryer;
   a second duct connecting said vent outlet to an exterior vent; and
   a third duct connected to said filtered air outlet for connecting said device to an existing heating duct.

* * * * *